United States Patent [19]
Orain

[11] 3,906,747
[45] Sept. 23, 1975

[54] DOUBLE TRIPOD HOMOKINETIC JOINT
[75] Inventor: Michel Orain, Conflans-Sainte Honorine, France
[73] Assignee: Societe Anonyme: Glaenzer Spicer, Poissy, France
[22] Filed: May 30, 1973
[21] Appl. No.: 365,236

[30] Foreign Application Priority Data
June 1, 1972 France .............. 72.19689

[52] U.S. Cl............................................ 64/21; 64/8
[51] Int. Cl.² ............................................ F16D 3/30
[58] Field of Search................ 64/21, 8, 7, 17 R

[56] References Cited
UNITED STATES PATENTS

| | | | |
|---|---|---|---|
| 1,232,829 | 7/1917 | Moore | 64/8 |
| 2,186,846 | 1/1940 | Trbojevich | 64/21 |
| 2,983,119 | 5/1961 | Glover | 64/21 |
| 3,016,721 | 1/1962 | Davis | 64/21 |
| 3,318,108 | 5/1967 | Cadiov | 64/8 |
| 3,613,396 | 10/1971 | Drevard et al. | 64/21 |
| 3,757,534 | 9/1973 | Orain | 64/21 |

Primary Examiner—Samuel Scott
Assistant Examiner—Randall Heald
Attorney, Agent, or Firm—Baldwin, Wight & Brown

[57] ABSTRACT

A double tripod homocinetic universal joint. The double tripod joint is formed of two single tripod joints, each single tripod joint has a three-armed member with rollers slidably and rotatably mounted on each arm. A common sleeve provided with closed roller paths of circular cross section transmits torque between the individual single tripod joints. A ball joint centering means comprising a ball member on one shaft and a socket on the other shaft assures radial holding. Other ball joint connection may be provided between a ball-like member on one of the shafts and socket means formed on members fixed to the sleeve. This arrangement is also adapted to telescopic (or sliding) universal joints.

22 Claims, 37 Drawing Figures

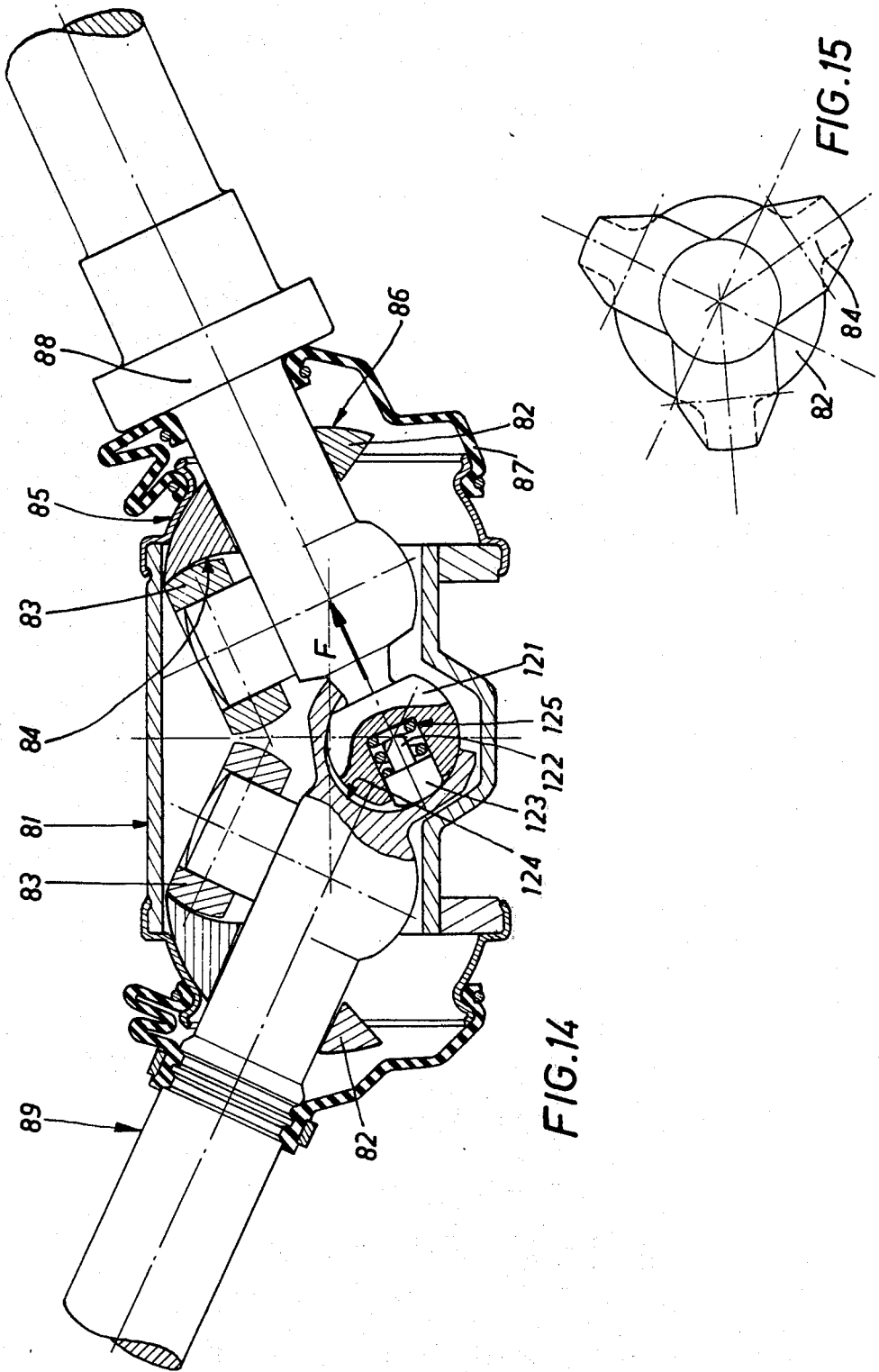

DOUBLE TRIPOD HOMOKINETIC JOINT

The present invention concerns homocinetic joints or couplings of the type comprising three rollers retained radially in closed grooves of circular cross section such as disclosed in French Patent No. 1,272,530. The technical advantages of this type of constant velocity coupling (or homocinetic coupling) include a large load capacity with reduced size, long service life, operability at wide operating angles, and adapted to relatively high precision manufacture which permits numerous applications, particularly in lateral transmissions for motor vehicles.

According to the invention, the technical possibilities and qualities of this joint could be greatly improved, particularly insofar as the size of the operating angles, the torque transmitting capacity for its dimensions, the possibility of simultaneously obtaining very free sliding and large operating angles, and the simplicity and ease of construction. With these aims in view, the present invention consists broadly speaking in a double tripod homocinetic joint comprising the combination of two tripod or three-armed homocinetic joints, for example two couplings as described in French Patent No. 1,272,530, the radial holding being assured by a sliding, or non-sliding, ball joint centering means, the transmission of the torque between the two individual joints being effected by means of a common member having closed roller paths or races of substantially circular cross-section.

According to the invention, the operative section of the joint comprises races, which hold the respective rollers captive by means of two facing arcuate paths, the assembly may be held together by any suitable connecting means between the races, for example, a panel or a circular or rectangular guard, this connecting means may or may not be centered along the arcuate paths of the races.

The solution according to the invention combines, in a single joint, two tripod joints by radial centering means enabling the use of the large radial load transmitting capacity between a tripod or three-armed member and the part provided with the closed grooves of circular cross-section for withstanding the reaction from the radial centering under torque loading conditions while running at an angle. By this simple means, the invention therefore provides the possibility of avoiding complicated and delicate arrangements which up to now were necessary for the radial load transmission (double universal joints or double bipod joints). Numerous means may be utilized to effect the double tripod homocinetic joints according to the invention. They all have the advantage of dependable operation and exceptional reliability and endurance with limited dimensions. Finally, they are very simple and relatively inexpensive in comparison to various known homocinetic joints.

Further, it is necessary to note the following concerning the possibilities of the invention as well as the exceptional simplicity which produces its advantages.

Known double universal joints or double bipod joints receive the radial reaction force of the centering ball member at the bevels or faces at the ends of the cross member of the universal joints or along the bearing surfaces at the ends of the bipod arms. These radial reaction forces have a substantially fixed direction in space when the joints run at an angle and are therefore in alternate directions relative to the ends of the cross members in a univeral joint or the arms of a bipod. Consequently, when there is play between the bevels or the bearing surfaces, undesirable knocking is present when the joint transmits torque while running at an angle following breaks in contact and the abrupt re-occurrence of the play between the bevels and the bearing surfaces. This happens twice each rotation of the joint. Major disadvantages, well known to users of double universal joints are totally eliminated by the double joint according to the invention since the radial reaction forces of the ball-centering means is absorbed by three rollers bearing permanently against grooves and the arms for each shaft which constitutes a powerful isostatic radial load transmitting device without play.

Moreover, the combination of two tripods provides great advantages over the single tripod joint, nevertheless preserving the well-known qualities of these joints—their sturdiness, sure and quiet operation without requiring constructional precision.

1. Elimination of radial planetary excentricity between the two shafts being coupled, excentricity which is produced with the single tripod joints and may generate parasite reactions;

2. Elimination of the lack of homocineticity (constant velocity characteristic), this defect being due to said cyclical excentricity according to the invention, the excentricities of the two individual tripod joints are in phase, and consequently the sleeve remains exactly in the plan bisecting the angle between the two shafts.

3. Elimination of the axial reaction forces between the two coupled shafts, which reaction forces are caused by friction between the rollers on the arms and in the grooves. In effect, the ball-joint pivoting system constitues an axially fixed retaining means for the two shafts which absolutely cannot be displaced relative to each other. This axially fixed ball joint is only possible in the present combination of two tripods for reasons of its assembly. This leads to an absolutely pure, ideal transmission of rotation, force of non-homocinetic short comings, as well as radial excentricities and cyclical axial displacements irrespective of the operating angle, the torque transmitted and the angular velocity.

According to one aspect of the invention: the races are grooves of substantially circular cross section facing one another, the distances between the center of the ball member and the planes passing through the axes of the three arms or spindles fixed to the driving and driven shafts respectively are substantially equal, one of the shafts carrying a sphere retained therein by circlips, a cap pivotally mounted on the sphere for closing off the sleeve associated with elastic bellows.

Alternatively, the ball member of the joint may have three flat inclined surfaces whose sliding surfaces are the closed surfaces determined by the sides of the rollers when the joint is run at an angle.

Alternatively, to enable relative axial sliding of the two shafts towards or away from each other during torque transmission while operating at an angle, one of the shafts has an end bore in which a bar slides, the bar carrying a ball like member which is held captive in socket on the other shaft, the bar being keyed angularly to the other shaft, and a ring of antifriction material retaining the concave outersurface of the socket on the other shaft.

Alternatively, the inner surface of the socket of one of the shafts is cylindrical and an anti-friction ring is interposed between the cylindrical surface and the ball member fixed to the other shaft, the two, three-armed washers arranged in the spherical supporting zones are provided for retaining the sphere carried by the other shaft.

Further, a cap is mounted on one of the shafts and secured inside the sleeve, the cap is in contact with the rollers of the said shaft and bears against a suitable collar fixed to the sleeve, a bellows providing a seal between the sleeve and the collar so as to reduce the axial and diametral dimensions of the other end of the joint.

The joint may include an elastomeric sheath which encloses the joint between the two shafts and which is stretched elastically in its longitudinal direction during operation at an angle.

The ball member of the joint has a cavity coaxial to the shaft provided with the ball member, and a stud is applied against the bottom of the socket by resilient means bearing against the closed end of the cavity.

The end of the first shaft is provided with a cylindrical bore, one end of the bore being opened and the other end close to the said shaft is frusto-conical, a socket in which the cap can oscillate is mounted for longitudinally sliding movement between a keeper ring and the portion inter-connecting the cylindrical and frusto-conical sections of the bore.

A star-shaped abutment member is fixed to one of the shafts between the circlips and one of the rollers, the star-shaped member having an inner spherical zone and a central bore of slightly greater diameter than the diameter of the other shaft.

Various embodiments of the double tripod joint according to the invention will now be described with reference to the accompanying drawings in which:

FIG. 14 shows a vertical cross-sectional view of a double tripod joint having means for taking up play caused by wear and manufacturing tolerances;

FIG. 15 shows a cross-section of a member for retaining and holding the assembly of the joint in its axial position;

Figure 1:
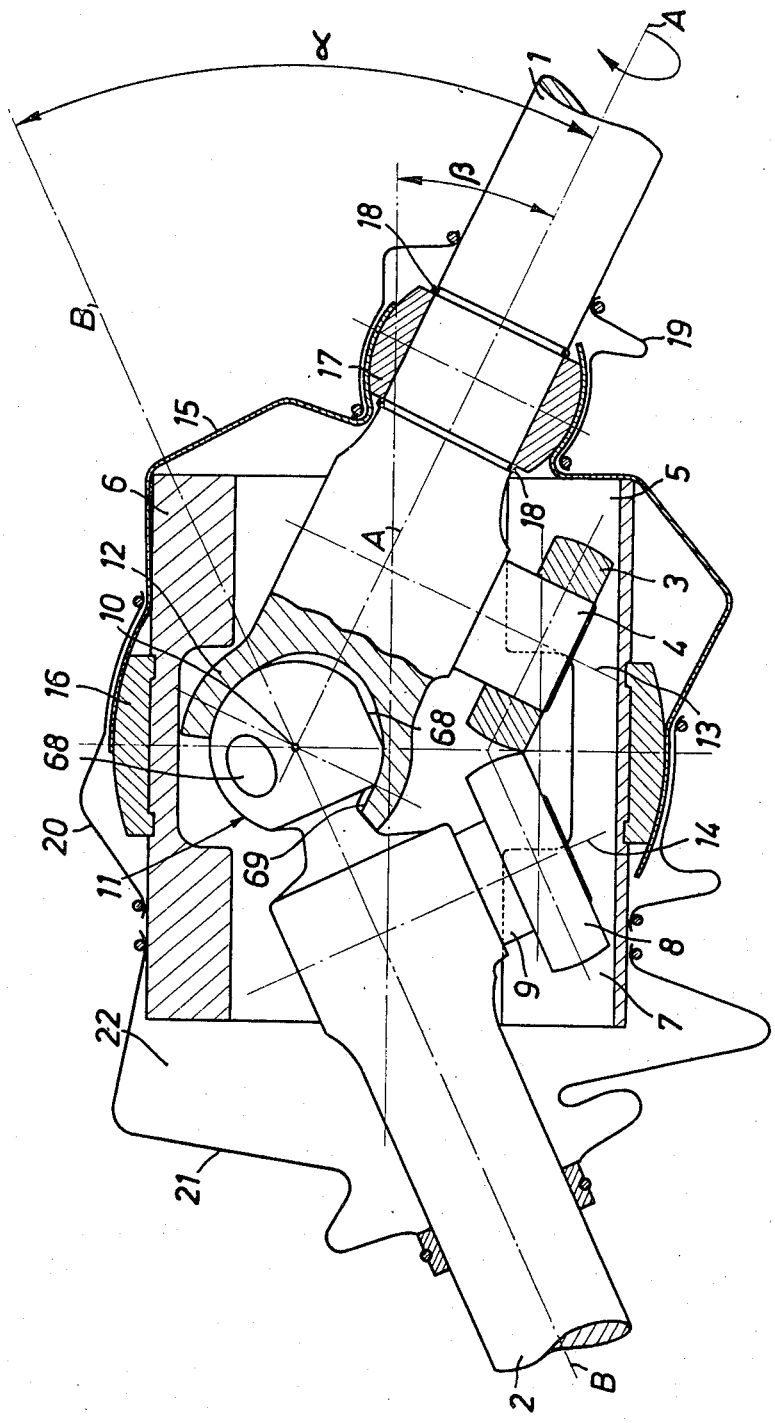
FIG. 1 shows an axial sectional view of the double tripod joint.
Figure 2:
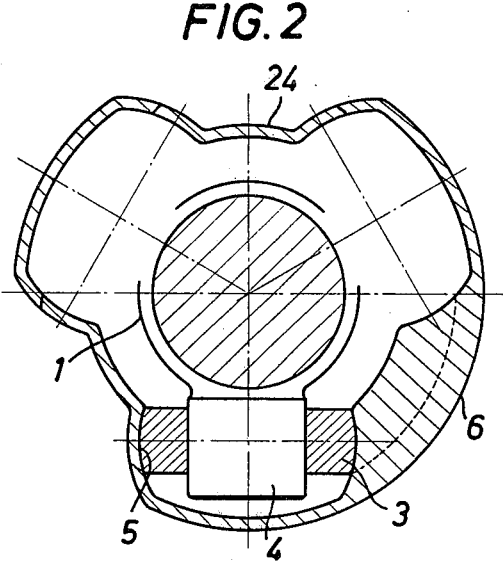
FIG. 2 shows at the right a cross-section taken along the line II—II of FIG. 1 and at the left a cross-section corresponding to an alternative embodiment, the axis of the corresponding element being horizontal in both cases.

FIGS. 1 and 2 show a joint in which the driving shaft 1 transmits the torque and rotational movement in homocinetic manner to a driven shaft 2 which is at a fixed or variable angle $\alpha$ from 0° to 50° or more.

Each one of the three rollers 3 is rotatably and slidably mounted on a respective one of the three arms 4 integrally formed with the shaft 1. Each of the three rollers 3 which are spherical or substantially spherical roll captive in the grooves spherical of circular or substantially circular cross-section facing one another. Each roller 3 exerts the transmitted force against its associated groove 5 machined in the sleeve 6 which in turn transmits the force via the groove 7 machined in the same sleeve to the roller 8 on the arm or spindle 9 integral with the shaft 2.

The axes AA and BB of the two shafts 1 and 2 intersect at point 10, the common center of the ball member 11 and the socket 12.

In the embodiment illustrated in FIG. 1, the distance between the center of the ball member 10 and the plane passing through the axes 13 of the three arms integral with the shaft 1 is equal to the distance between the center 10 and the plane passing through the axes 14 of the three arms integral with the shaft 2. The angle $\beta$ between the axis of the shaft 1 and the axis of the sleeve 6 is equal to half the angle $\alpha$ between the shafts 1 and 2. It should be noted that this arrangement is essential. The constant velocity or homocinetic nature is nevertheless preserved even if the two distances are different for reasons of construction, for example, because each of the two individual joints is a homocinetic joint.

When the joint is running at an angle, the radial reaction against the shafts 1 and 2 of the ball joint centering means is received by the arms, and the rollers are therefore subject to forces complementary to those due to torque transmission to which they are added or from which they are subtracted depending on the case.

The two pivotally connected shafts 1 and 2 are coupled to each other radially and axially by the ball joint centering means. The position of the shafts relative to the sleeve 6 is effected by the cap 15 pivoted on the annular ball-like member 16 with a spherical outer surface fixed to the sleeve 6 and on the annular ball-like member 17 with a spherical outer surface which is held on the shaft 1 by circlips 18. The cap 15 may be of stamped metal or plastic. In addition to the axial retaining of the sleeve relative to the shaft 1, it also assures the closure of the sleeve in cooperation with the elastic bellows 19, 20 and 21. The lubricant required by the operation of the device may be efficiently retained in the tight enclosure 22 formed thereby.

The ball-like members 16 and 17 on which the cap 15 oscillates are placed at either side of the plane of the axes 13 and substantially equidistant therefrom. Accordingly, the operating angles of the ball-like members and the bellows 19 and 20 are at the same minimum value, this produces better holding in service. The operating angle of this bellows is therefore one-quarter of the angle α between the shafts.

The tightness of the left-hand part of the device (FIG. 1) is effected by means of a single member, i.e. bellows 21. The tightness at this end could also be assured as shown at the right by means of two members with ball-like outer surfaces, one of which must be slidably mounted on the shaft 2 or the sleeve 6.

The sleeve 6 may have a cylindrical outer surface 23 (cross section to the right in FIG. 2) or a lobed outer surface 24 formed as a profiled thin tube (cross section to the left in FIG. 2).

For reasons of assembly, the ball member 11 has three flat portions 68 which enable its introduction into the interior spherical zone of the socket 12 which has three corresponding notches 69. Assembly is easily effected by moving shaft 1 at an angle of 60° relative to shaft 2 before introducing the rollers into the sleeve 6.

Figure 13:
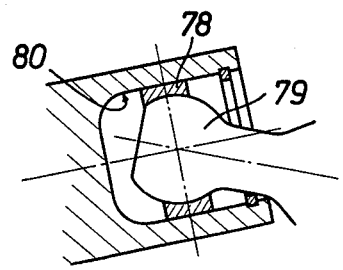
FIG. 13 is a detail of FIG. 11.

The sleeve 6 may be retained axially by means of three sloping members 75 (FIG. 4) formed of a material enabling sliding, the roller surfaces of the rollers sliding along the slopes of the sloping member during the rotation of the joint. The shapes of the slopes 76 of the sloping member are substantially closed surfaces determined by the roller surfaces of the rollers during the rotation of the joint running at an angle (see FIGS. 4 and 13).

Figure 3:
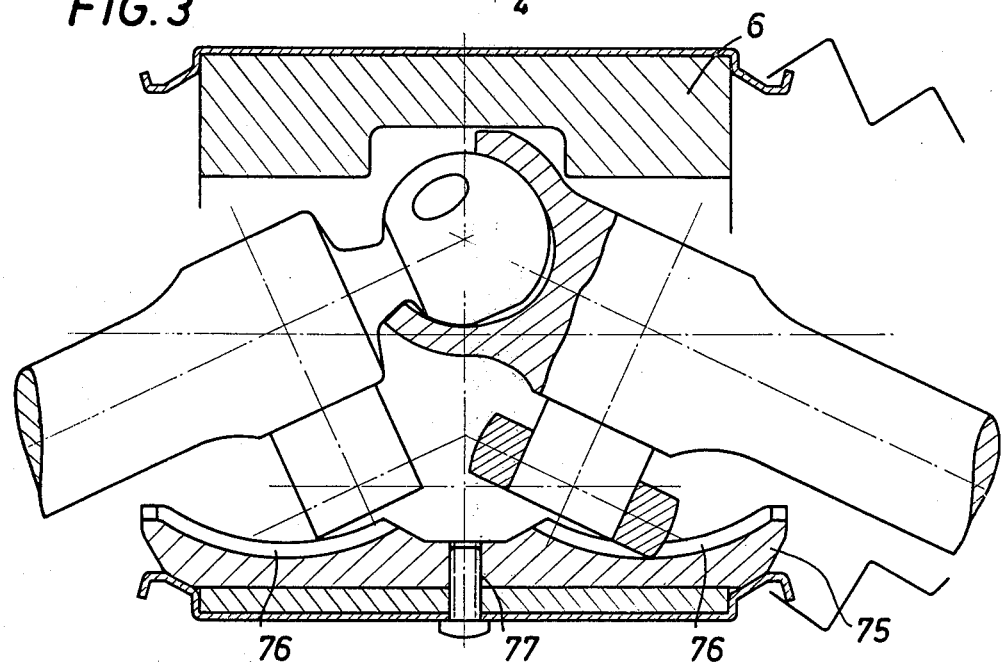
FIG. 3 is a longitudinal sectional view of an alternative embodiment.
Figure 4:
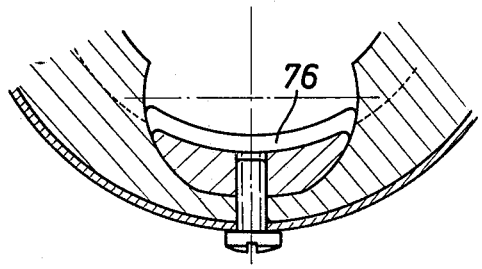
FIG. 4 shows a detail in section taken along the line IV—IV in FIG. 3.

The three sloping members may be axially retained by a steel keeper held simultaneously in an annular groove in the sloping member and a groove in the inner hollowed-out portion of the sleeve or more simply by pins or screws 77 (as shown in FIGS. 3 and 4) extending through the sleeve and fastened to each of the sloping members.

The axial forces exerted on the sleeve 6 are slight and this manner of axially retaining the sleeve may be effected simply. The sleeve 25 has six roller grooves 26 of closed circular cross-section. Each groove 26 retains a roller 27 with substantially spherical outer surface rotatably and slidably mounted about a respective arm 28 (FIGS. 3, 4 and 5).

In this embodiment, the three rollers 27 slidably mounted on the arms or spindles 28 integral with the shaft 29 roll while being retained in the grooves 26, the three rollers 32 slidably mounted on the arms or spindles 33 integral with the shaft 30 roll as they are retained in the grooves 31 which are angularly spaced 60° relative to the grooves 26.

Figure 7:
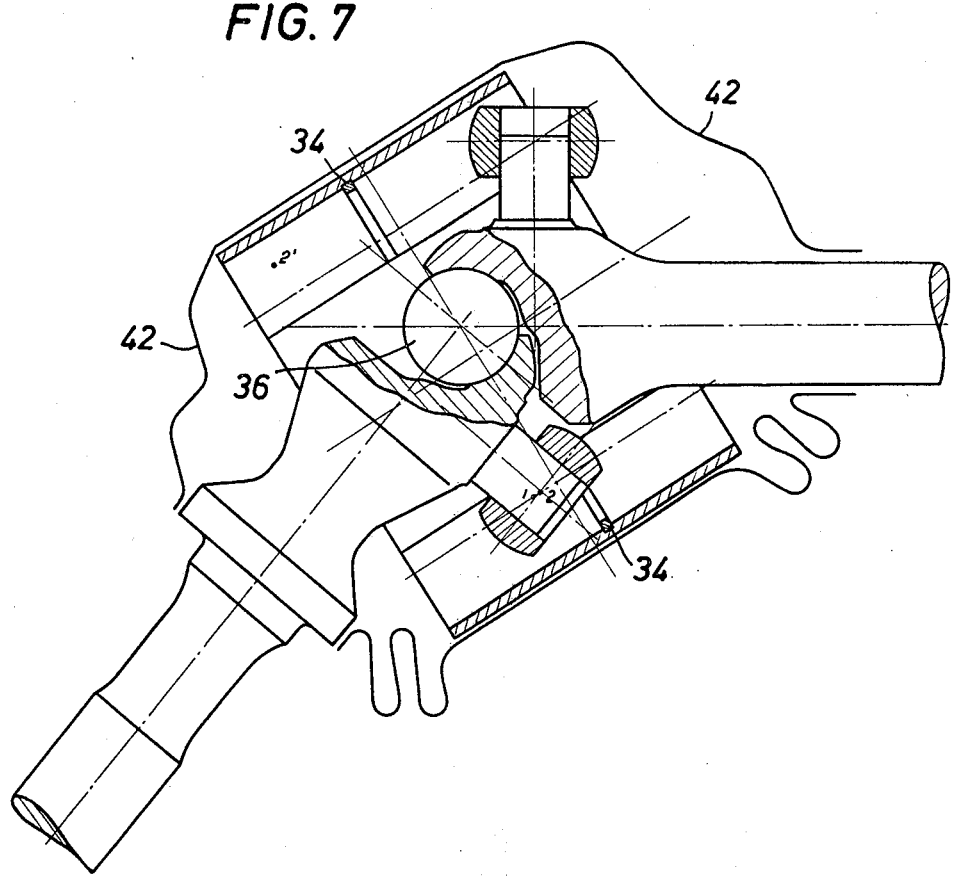

This embodiment provides a very compact device since the rollers may intersect at very large angles (FIG. 7). The disengagement of the rollers relative to the sleeve is prevented by the keeper rings 34 (FIG. 7) which are for example formed of spring steel fitted in special slots. The disengagement-preventing stops (FIG. 5) formed by the blocks 41 of shock-absorbing material are held by keeper rings 42 fitted in slots out in the grooves 26.

Figure 5:
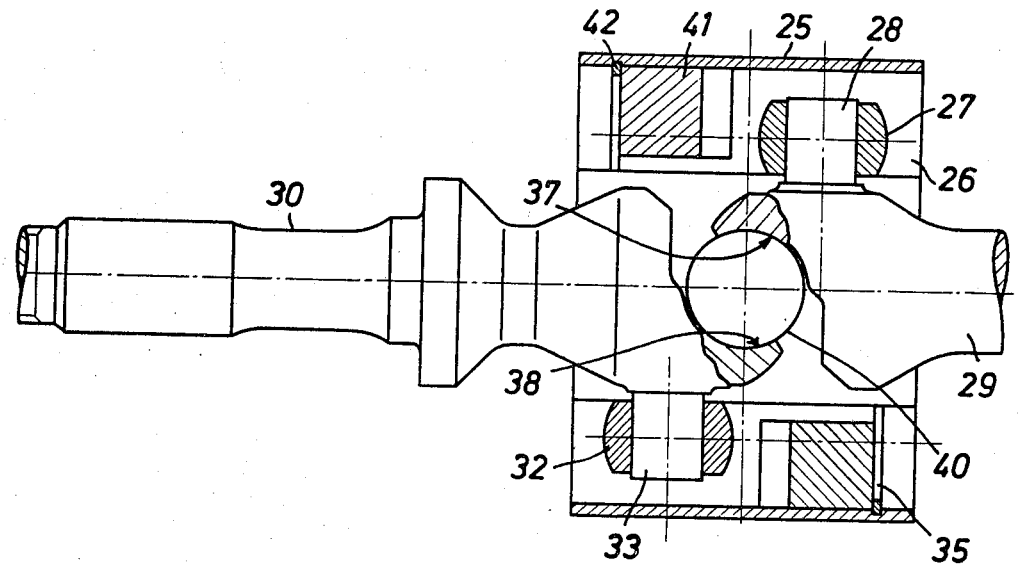
FIGS. 5 to 7 show another alternative embodiment.
Figure 6:
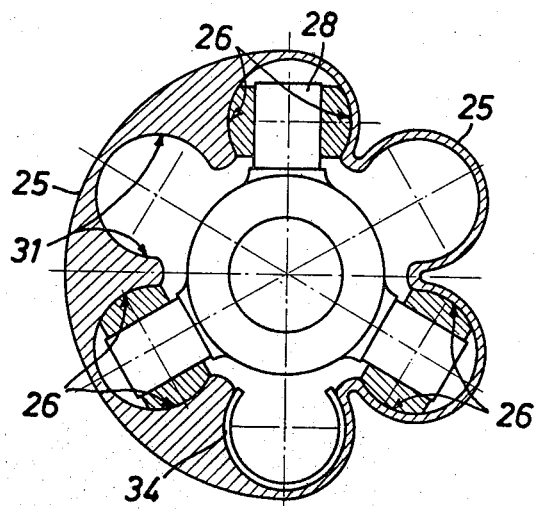
Figure 8:
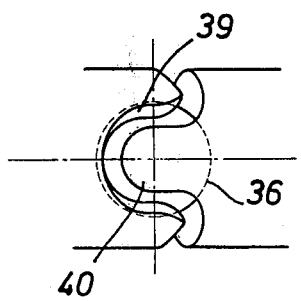
FIG. 8 shows an enlarged detail of FIG. 5.

The radial centering means in the embodiment of FIGS. 5, 6, 8 comprises a ball member 36 held captive by an inner spherical surface 37 formed on the shaft 29 and an inner spherical surface 38 formed on the shaft 30 and a plurality of cutouts 39 and teeth 40 meshing and mating during the rotation of the joint whether it is running at an angle or not. In FIGS. 6, 8 the centering means comprising three cutouts and three teeth is the most satisfactory solution for the particular use envisaged. This centering enables angular clearance of 60° or more, if necessary, which is not possible with known centering means; it is also highly wear resistant, the ball member being capable of random rotation in every direction during operation.

The bellows S seals off the device.

The sleeve 25 may be formed as a solid member (as shown to the left in FIG. 6) or a drawn or lobed tube (as shown to the right in FIG. 6).

Figure 9:
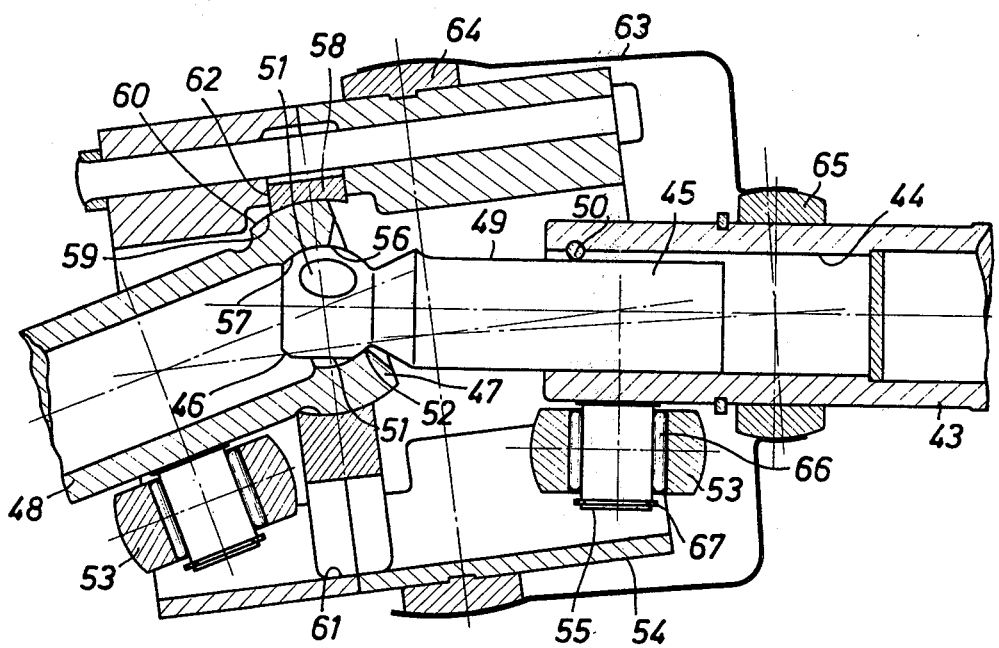
FIGS. 9, 10 and 11, 12 show examples of telescopic joints.
Figure 10:
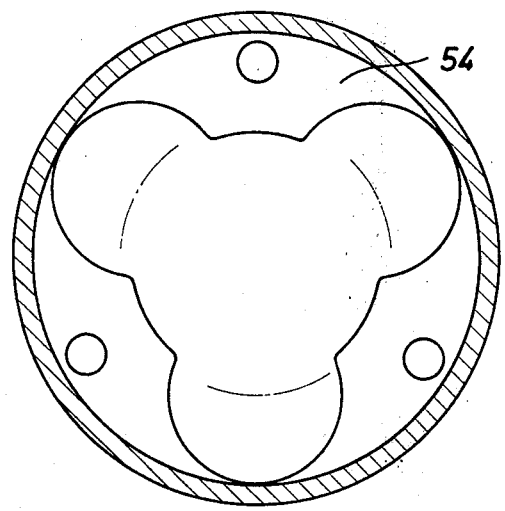

FIGS. 9 and 10 show an alternative embodiment of the constant velocity joint in which relative axial sliding movement of the two shafts towards or away from each other is possible while running at an angle and under torque transmitting conditions.

The shaft 43 has a bore 44 for guiding the sliding bar 45 carrying at one end the ball member 46. This ball member 46 is held captive in the socket 47 integral with the shaft 48. The sliding bar 45 is keyed against angular displacement relative to the tubular shaft 43 by means of slot 49 formed in the bar 45 and the small ball 50 housed in a machined cavity in the bore of the shaft 43. The arrangement permits the assembly of the ball member 46 provided with three flat portions 51 in the socket provided with three notches 52 before the rollers 53 are received in the sleeve 54 by the 60° relative angular displacement of the arms 55 carrying the rollers of the shaft 48 with respect to the shaft 43. In this position, the flat portions 51 face the edge 56 while the spherical portions of the ball member 46 face the notches 52, thereby allowing the introduction of the ball member 46 into the socket 47. The subsequent positioning of the arms 55 on the two shafts 43 and 48 and the introduction of the sleeve prevent the disengagement of the ball member, the spherical portions of the ball member being held captive in the inner spherical surfaces 37 of the housing or socket 47.

A ring 58 of anti-friction material with a spherical inner surface 59 holds the outer surface 60 of the ball member 46 captive. This ring is radially displaceable in the boring 61 but is retained axially by two shoulders 62 in the bore of the sleeve which in this embodiment is formed in two parts for enabling the mounting of the ring 58.

In this embodiment the sealing at the right is assured by a plastic cap 63 oscillatingly mounted on the ball-likes members 64 and 65 and at the left by the same means or any other known means such as elastic bellows.

The rollers 53 are mounted on the arms 58 by means of the needles 66 held in place by circlips 67. This arrangement facilitates the sliding of the shaft 43 outwardly.

Figure 11:
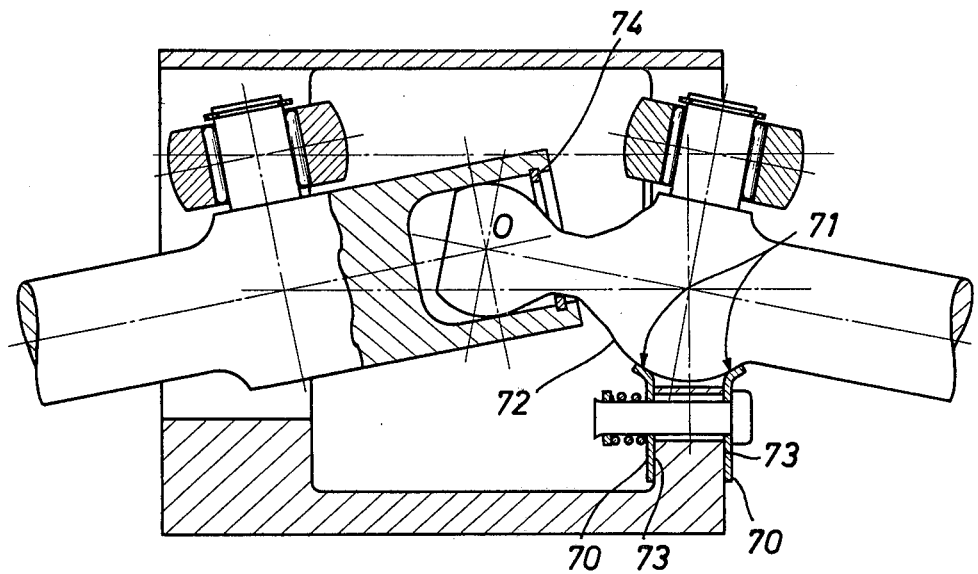
Figure 12:
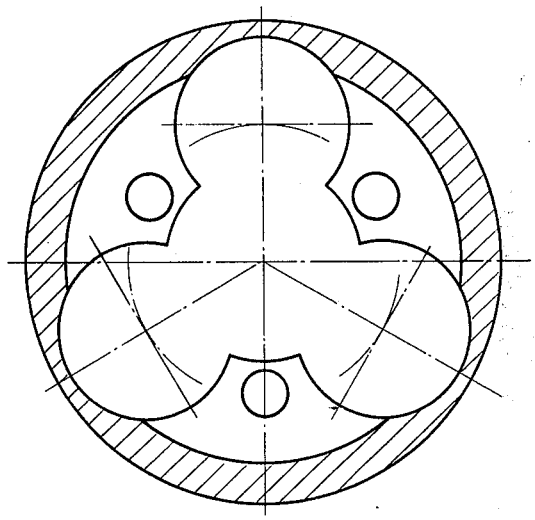

FIGS. 11 and 12 illustrate another embodiment of the sliding joint in which the mounting of the ball member is particularly suitable for telescopic action or very free elongation of the joint even when large amounts of torque are transmitted. As a matter of fact, the principal force acts at the point O at the center of the ball perpendicular to the plane of the axes of the shafts which is also the plane of FIG. 11. When running at an angle — even fixed — and transmitting a load, there occurs a continual sliding of the ball member against the inner surface of the socket which in this case is cylindrical. Consequently, there is an elimination of friction during inward or outward telescopic movement. An anti-friction ring 78 may also be positioned between the bore 80 and the ball member 79 (see FIG. 13).

The assembly may be retained axially by two star-shaped washers 70 each with three arms and spherical bearing portions 71 engaging the spherical portion 72 formed on one of the shaft. These washers lie flat against the wall 73 by biasing means which allow them a certain degree of radial freedom.

A keeper ring 74 prevents the withdrawal of the ball member from the cylindrical socket.

The sealing arrangement for the device is not illustrated. If high rotational velocities are to be obtained, the means for mounting the ball member may be replaced by any suitable arrangement, for example as taught in French Patent No. 70/42 175, filed on Nov. 24, 1970.

The homocinetic joint of FIGS. 14 and 15 comprises a sleeve 81 in which the solid bowl-like members 82 shown in FIG. 2 retain the device axially. The solid bowl-like members form washers 82 retain the rollers 83 of the joint along their concave surfaces 84 and are in ball joint bearing relationship against the collars 85 along their spherical surfaces 86. The bellows 87 of elastomeric material assure sealing and retain the lubricant surrounding the assembly between the collar sections 85 and the shafts 88 and 89. This embodiment of the ball joint means for relative centering of the shafts 88 and 89 further comprises a cavity 122 in the ball member 121 in which a stud 124 of anti-friction material is slidable. A coil spring 125 exerts a force on the stud 123. Therefore, when the joint is not transmitting torque there is no possibility of knocking.

Figure 16:
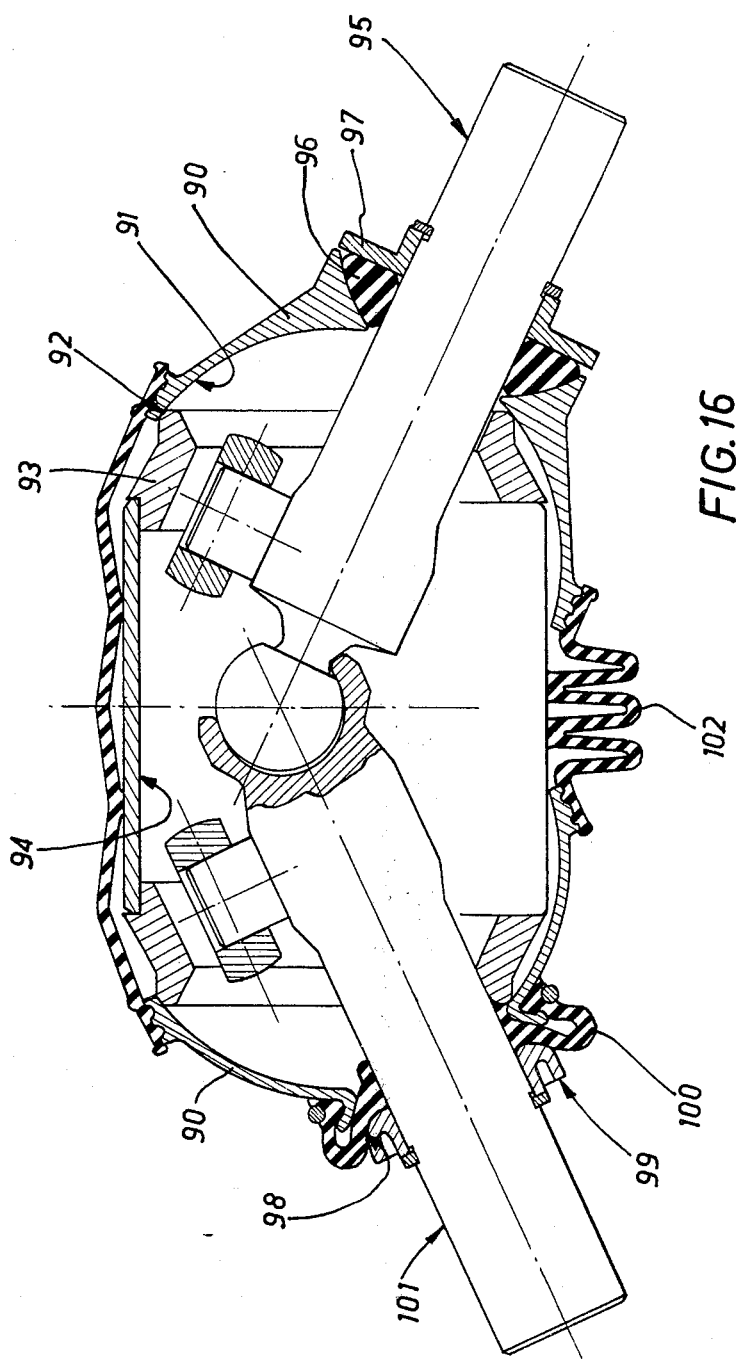
FIG. 16 shows at its right and left two different variations in means for axially retaining the assembly of the joint.

In the embodiment of FIG. 16 the following is shown:

1. at the right-hand side a collar 90 with spherical inner surface 91 bears in ball joint bearing relationship against a bearing surface 92 of a ring 93 which bears against the sleeve 94 of the joint. This collar 90 retains the shaft 95 by means of an O-ring 96 having a large cross-section which is shown deformed under the effect of the axial bias. The O-ring is retained by the flange 97 fixed to the shaft 95 by any suitable means; the elasticity of the O-ring enables the oscillation of the cover section 90 and provides tightness between the shaft and the collar.

2. at the left-hand side, an alternative form of the elastic connection between the collar 90 and the shaft 101 (this connection obviously could be used at the right-hand side of the assembly in the embodiment of FIG. 16). In the alternative form at the left, the bearing surface 98 of the collar is held by the flange 99 via sealing member 100 which simultaneously assures the tightness between the cover section 90 and the shaft 101.

In the constructions at both the right and left of FIG. 16, the central bellows 102 seals the device between the two collars.

Figure 17:
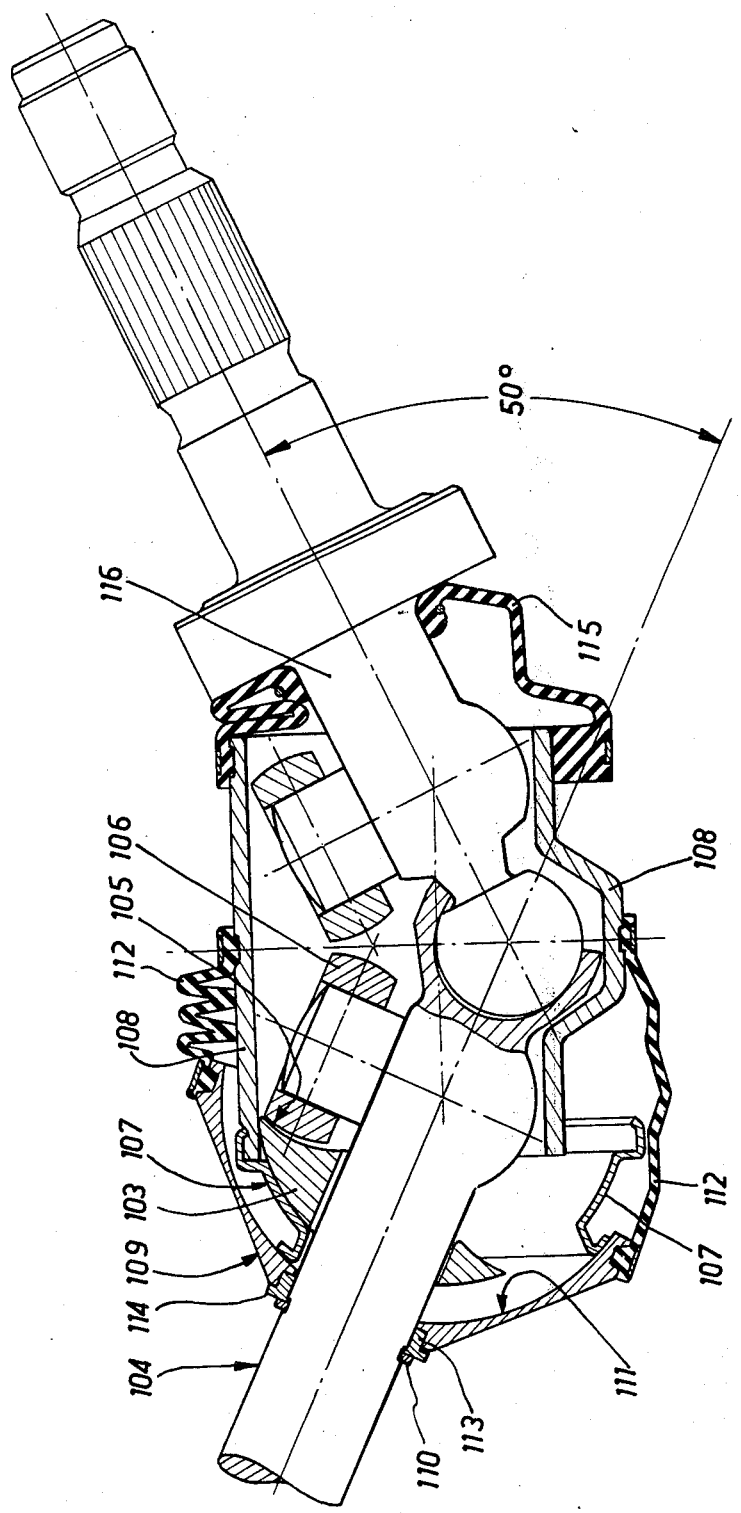
FIG. 17 shows a cross-section of an alternative construction of the retaining means.

At the left in the joint of FIG. 17 the axial holding of the sleeve 108 is effected by at one side for both directions. For this purpose a form washer 103 (similar to the washer 82 in FIG. 14) axially retains the shaft 104 by its engagement at 105 with the rollers 106 and in ball joint bearing contact with the collar 107 fixed by any suitable means to the sleeve 108. The collar 109 held axially relative to the shaft 104 by the keeper ring 110 and the washer 114 or any other known means is in ball joint bearing contact along its spherical inner surface 111 against the collar; 107. A bellows 112 provides the seal between sleeve 108 and the collar 109. An O ring 113 prevents lubricant from leaking between the roller 109 and the shaft 104. A bellows 115 provides the seal between sleeve 108 and the shaft 116 (right-hand side). This arrangement allows radial and axial dimensions at the other end (right-hand side) to be reduced which is advantageous or even essential for certain applications for example at the front wheels of a front-wheel drive automobile.

Figure 18:
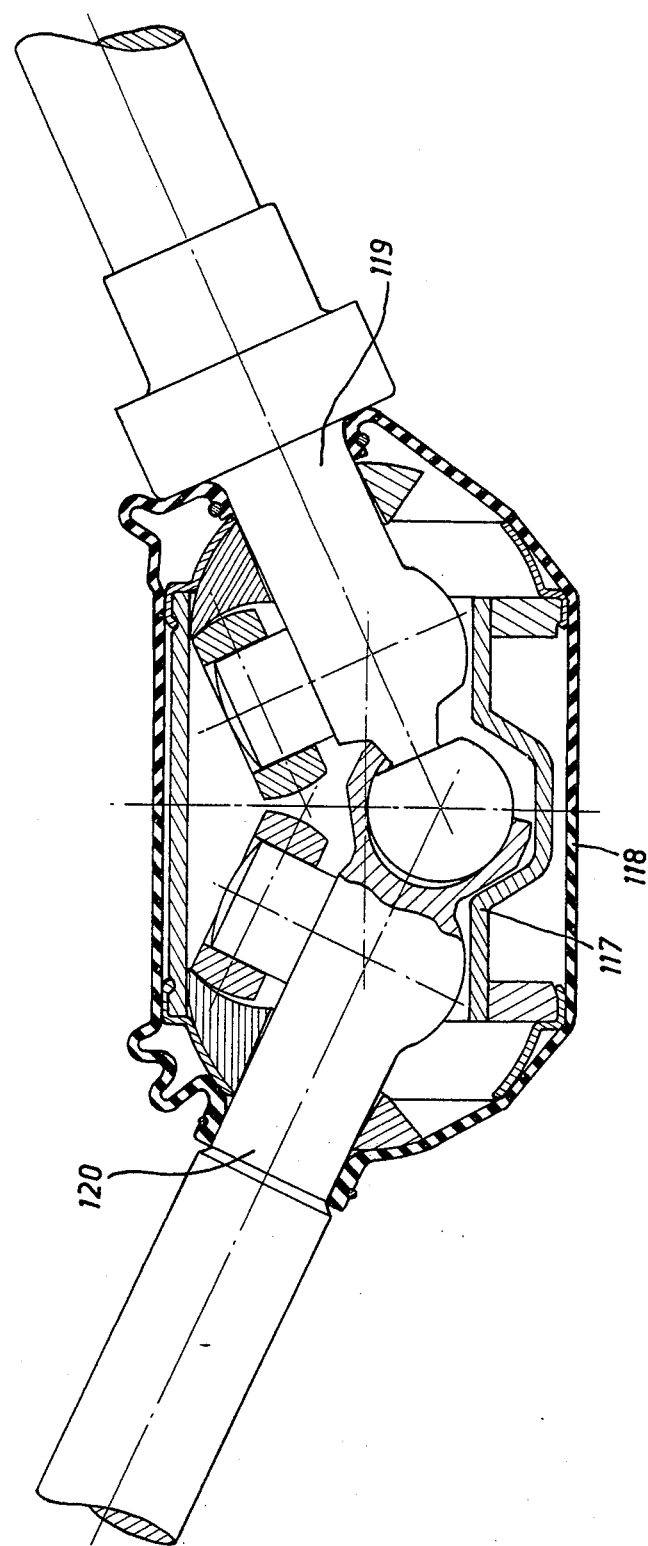
FIG. 18 shows a sectional view of sealing means for the joint of FIG. 14.

In the embodiment shown in FIG. 18, the sleeve 117 is retained axially by means similar to those shown in FIG. 14. Sealing is effected in this case by means of an elastomeric sheath 118 enclosing the joint between the shafts 119 and 120. This sheath operates by longitudinal elastic stretching while the joint is running at an angle. The sheath takes up minimal room relatively to bellows having pleats or corrugations.

Figure 19:
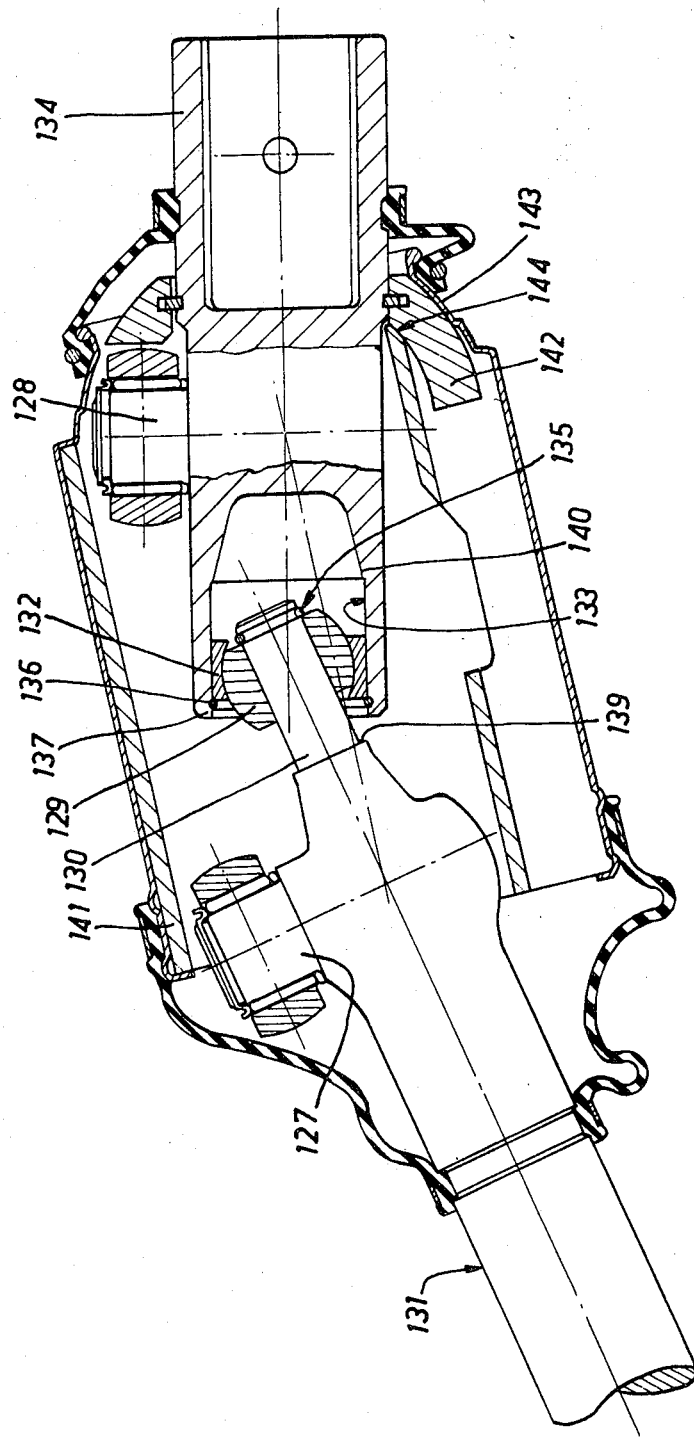
FIGS. 19, 20 and 21 show a variant of the embodiment of FIGS. 7 and 10.
Figures 20, 21:
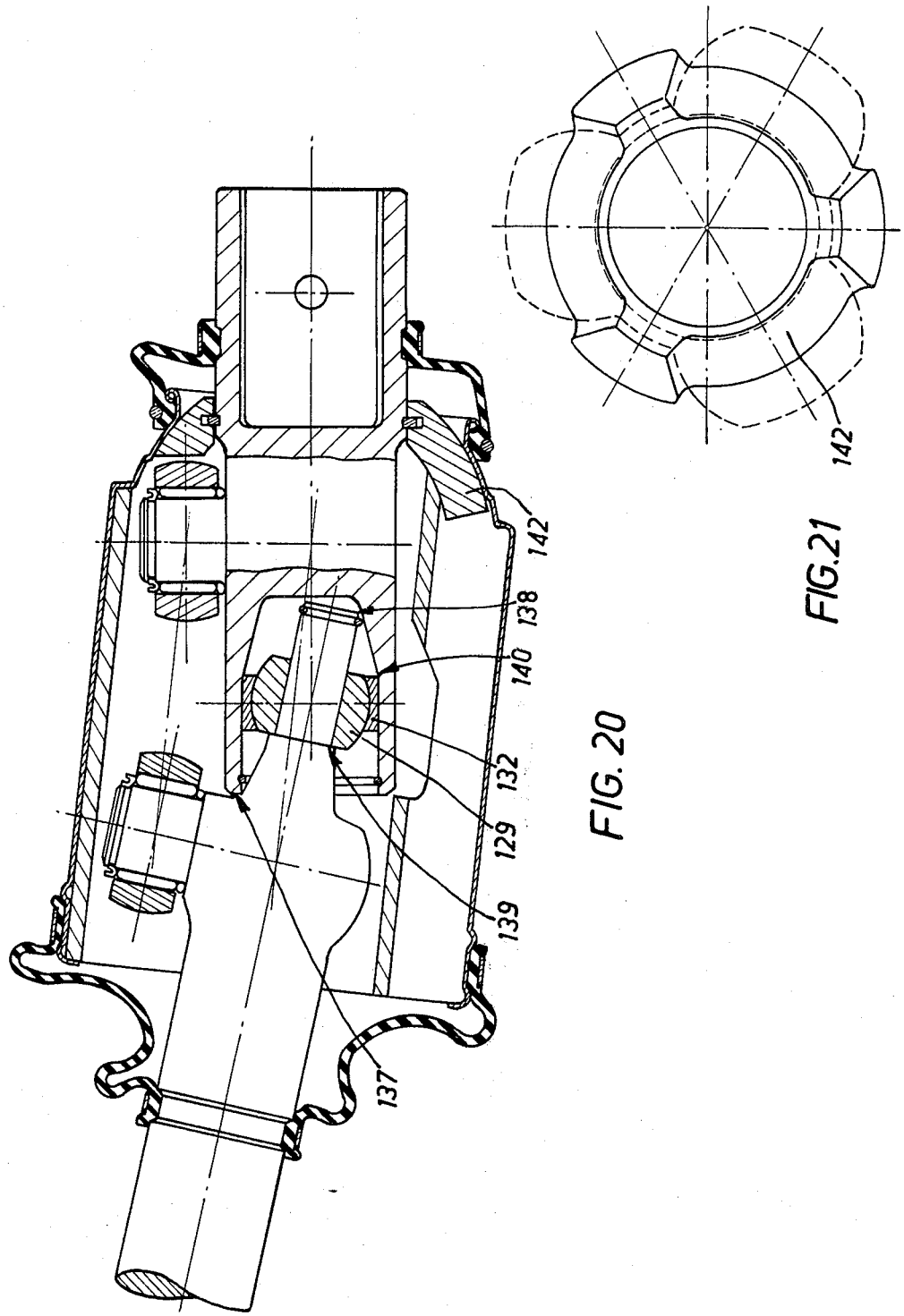

FIGS. 19 and 20 show an alternative embodiment of a double tripod telescopic — or sliding — joint taking up the same amount of room, but having a greater sliding capacity and angularity, than the embodiments shown in FIGS. 7–10. For these reasons, the combination producing the ball joint movement is slidable relative to both of the tripods 127 and 128. The central ball member 129 is axially slidably mounted on the spindle 130 integral with the tripod 127 and the shaft 131. The socket 132 is axially slidably mounted inside the bore 133 integral with the tripod 128 and the shaft 134. Under these circumstances, in the outermost sliding position, the ball member is at a position midway between the tripods 127 and 128 under the action of the keeper rings 135 and 136 (FIG. 19).

It is noted that in this position maximum angularity of the shafts may be achieved since no part interferes to limit the angular clearance of the ball joint means. When the maximum telescoped or innermost position occurs (FIG. 20) interference is produced at the outer end 137 of the bore 133 and at the outer end 138 of the spindle 130 for the reason that the ball joint means is again in its position midway between the two tripods 127 and 128 owing to the ball-like member 129 bearing against the shoulder 139 and the socket 132 bearing against the tapering section 140 of the bore 133.

The sleeve 141 is axially retained with respect to the two tripods by means of the castellated ring 142 (FIG. 21). Said castellated ring is held outwardly by the spherical portion 143 and inwardly by the spherical portion 144 of the edge of the sleeve 141.

Figures 22, 23, 24:
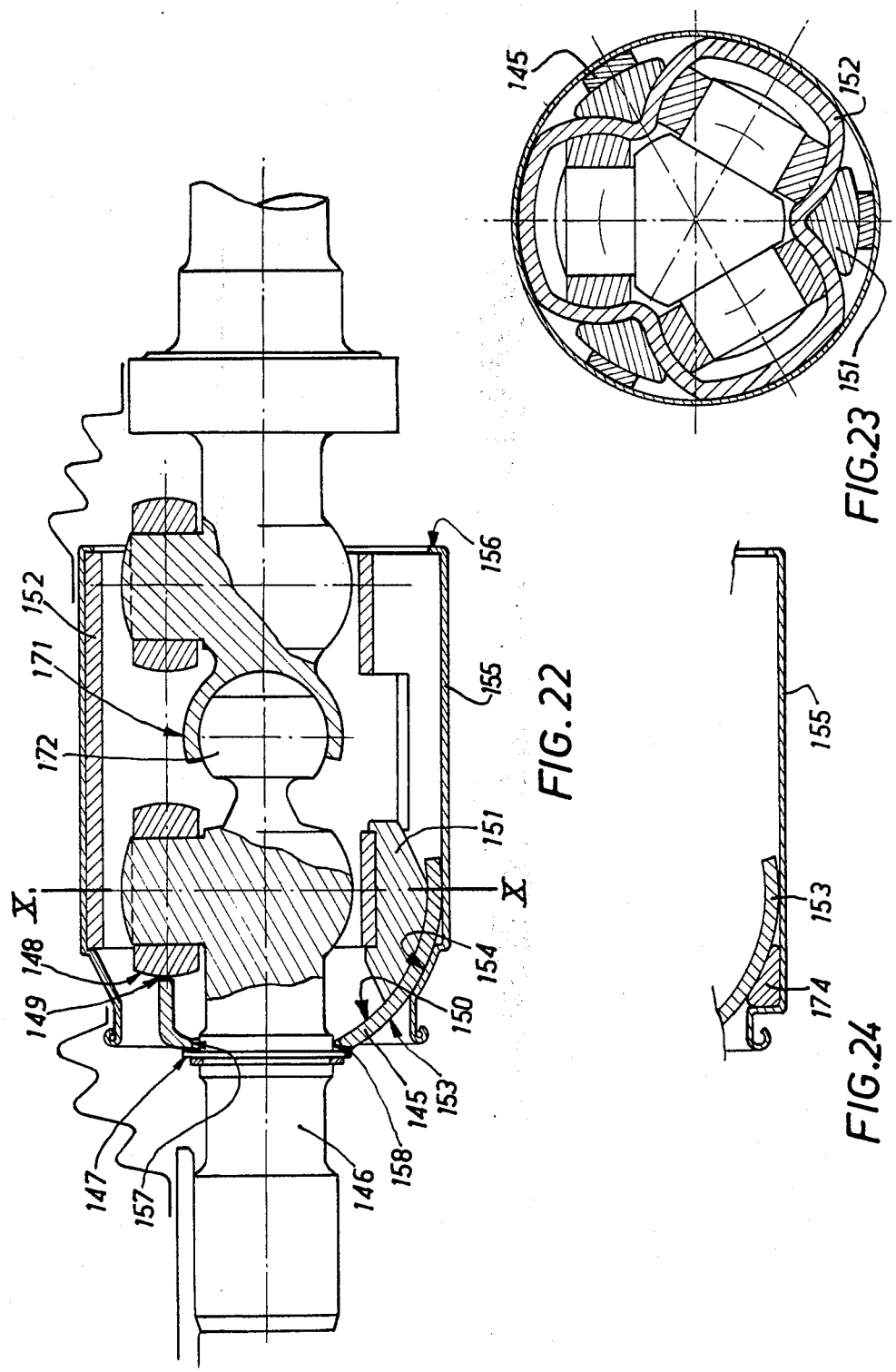
FIG. 22 is a longitudinal cross-section of a joint of small dimensions with axial retaining means.
FIG. 23 is a cross-section taken along the line X—X of FIG. 22.
FIG. 24 is a detail of FIG. 22.

A wide-angle non-telescopic (non-sliding) double tripod joint of small dimensions having axial retaining means is shown in FIGS. 22 and 23. The star-shaped abutment member 145 provides the axial retaining function. With this result in view, the star-shaped member 145 is secured to the shaft 146 against axial movement thereon by bearing against the circlips and washers 147 as well as the roller 148 through the tabs 149. The star-shaped member 145 which may be formed of stamped sheet metal has a spherical interior surface 150 in ball joint engagement with the bearing member 151 formed of a material favorable to sliding. The bearing members 151 are keyed to the sleeve 152. The spherical exterior surface 153 of the star-shaped member 145 is in ball joint bearing engagement with the spherical surface 154 of the cap 155 or with a ring 174 of antifriction material (FIG. 24). The cap 155 is secured to the sleeve 152 by a tongue 156 or other suitable means. The shaft 146 is thereby axially retained by the star-shaped abutment member 145. The central aperture 157 in the star-shaped member 145 is slightly greater than the diameter of the shaft 158 in order to permit the radial displacement of the two parts relative to each other according to the operating characteristics of the tripod constant velocity joint.

Figure 27:
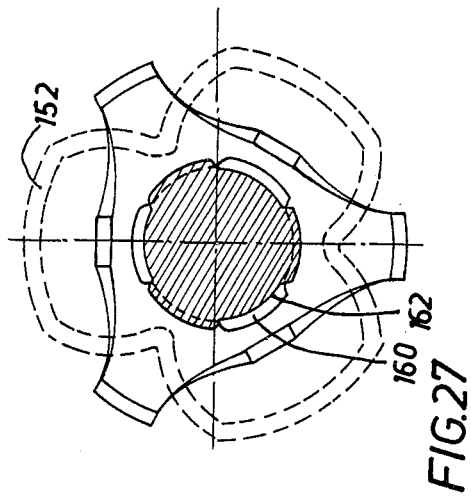
FIGS. 25–30 show various means of mounting the star-shaped retaining member of FIGS. 22 and 23.
Figure 29:
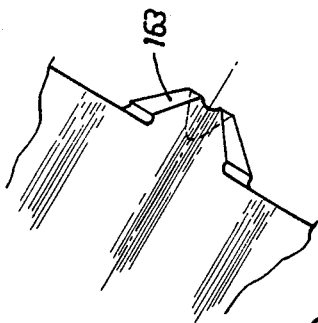
Figure 25:
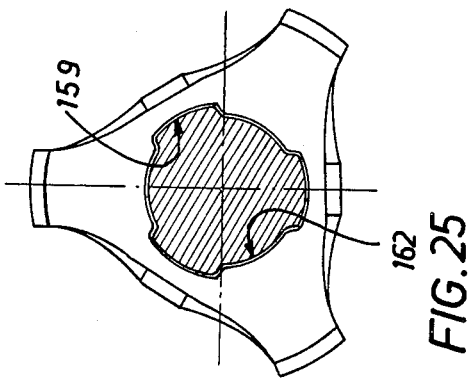
Figure 26:
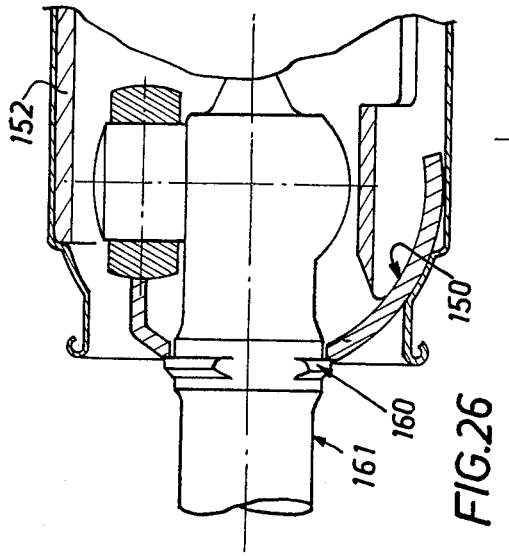
Figure 28:
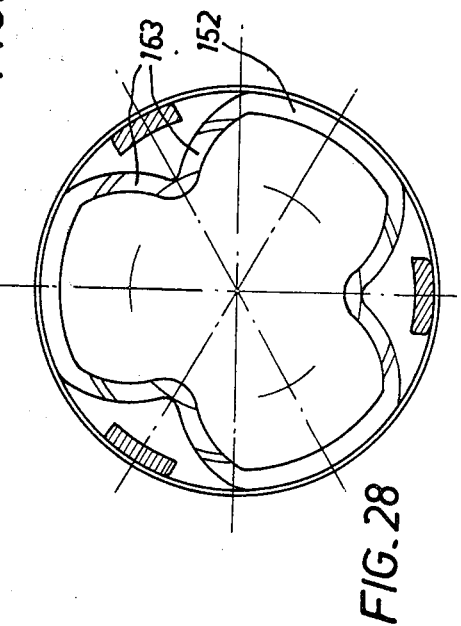

The star-shaped retaining member could also be fixed axially relative to the shaft without the addition of circlips and washers. In such a case, the star-shaped retaining member is formed as shown in FIG. 25, its central aperture includes three indented portions 159 which enable it to be threaded onto the projecting teeth 160 on the shaft 161. Once the star-shaped member is slid axially onto the shaft 161, a rotational displacement through 60° (see FIG. 27) moves the three theeth 160 opposite the edges 162 of the aperture of the star-shaped member which provides an effective axial retaining without the addition of extra parts. Once the sleeve has reached its operating position, no rotation of the shaft relative to the star-shaped member is possible; the axial retaining function is thus provided. It is noted that the spherical interior surface 150 of the star-shaped member (FIG. 26) bears against the spherical surfaces 163 on the tabs on the sleeve 152 (FIGS. 28 and 29).

Figure 30:
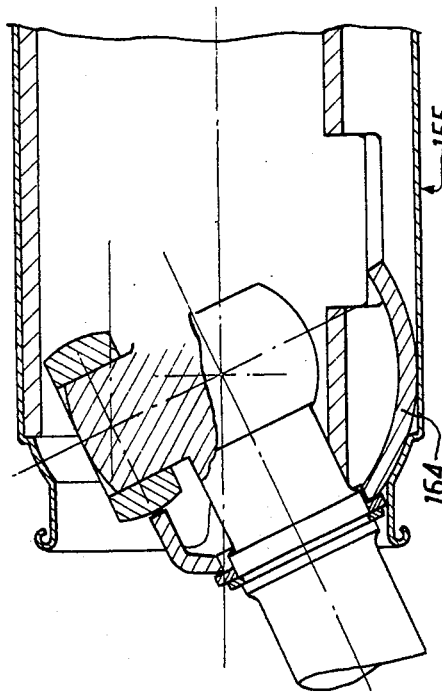

When the joint runs at an angle, each arm (FIG. 30) of the star-shaped member is retracted and acts in ball joint bearing relationship against the inner surface of the cap 155.

Figure 31:
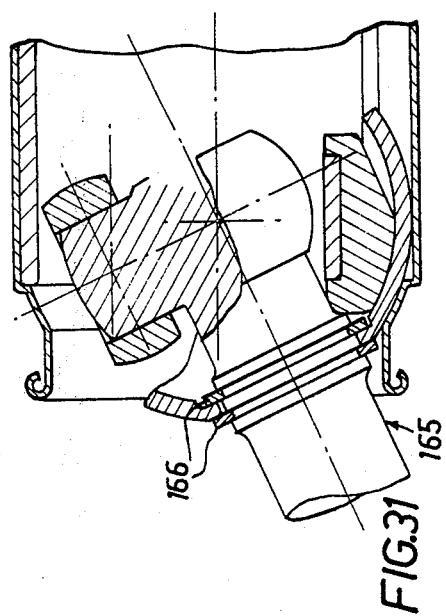
FIG. 31 is a partial view in section of an alternative axial retaining star-shaped member.

The star-shaped member (FIG. 31) could also be constructed so that it is held axially relative to the shaft 165 by two circlips. In this case there is no need for tabs bearing against the rollers.

Figure 34:
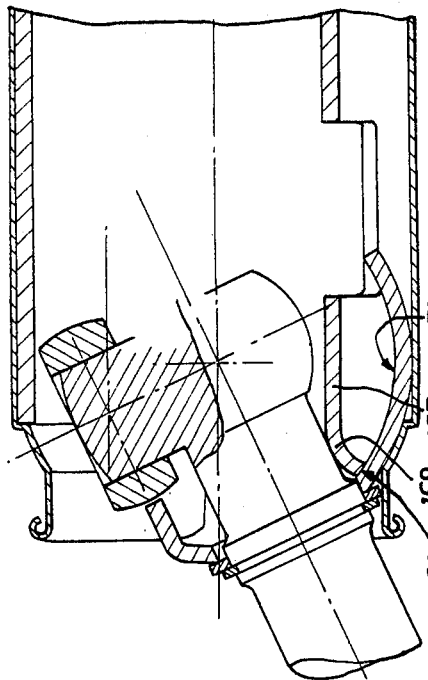
FIGS. 32–34 show another embodiment with bearing surfaces on the sleeve.
Figure 32:
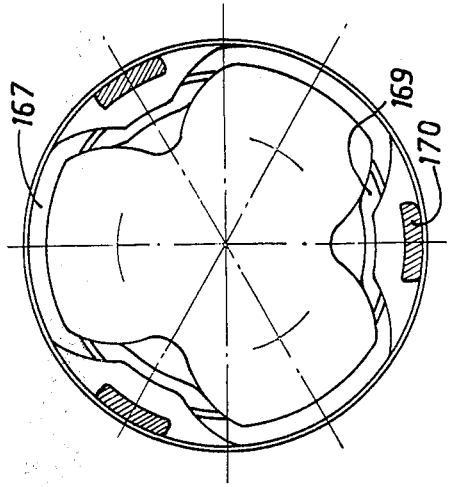
Figure 33:
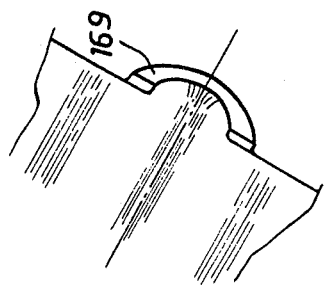

In the alternative embodiment of FIGS. 32, 33 and 34, the sleeve 167 has a lip 169 at one end; the edge 169 spherically machined providing a ball joint connection at the interior of the star-shaped member 170. A better bearing continuity between the inner spherical bearing surface of the star-shaped member and the spherical axial abutment surface of the sleeve is thereby provided.

Figure 36:
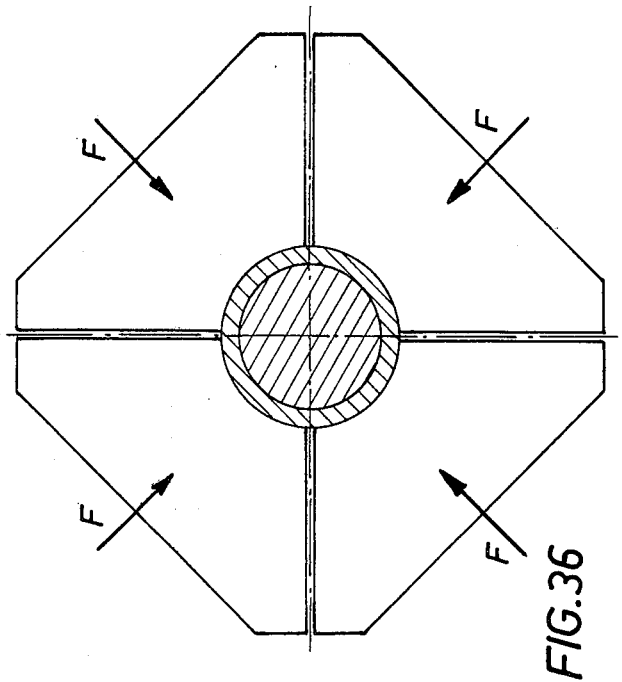
FIGS. 35–37 are schematic views showing the assembly of the joint according to FIG. 24.
Figure 35:
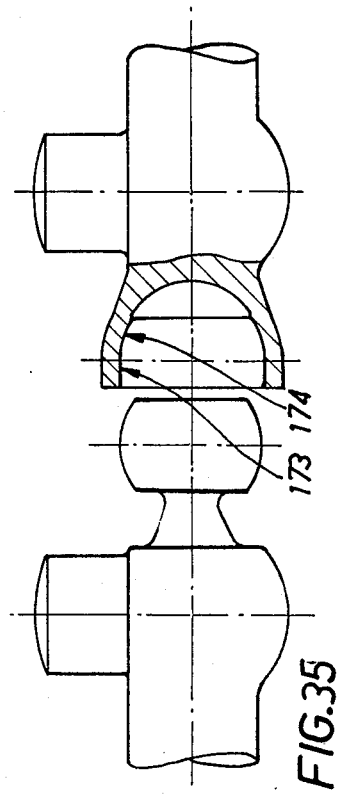
Figure 37:
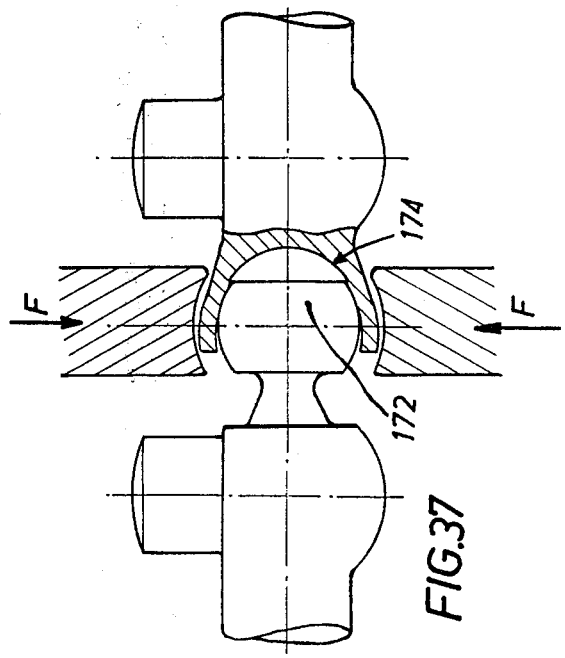

To better show one of the practical advantages of the present joint preferred means for enabling the assembly of the joint will be described below with reference to FIG. 35. In this case, the assembly of the ball joint means is effected by hammering out the socket 171 along the diameter on the ball member 172 by means of suitable tools. The inner ball member 172 first undergoes a hot quench and then it is carefully ground. The socket 171 has a cylindrical bore 173 before assembly (FIG. 35). The socket undergoes heat treatment in order to retain the possibility of a slight diametrical hammering-out of approximately 3 to 4%. At the time of assembly, the ball member 172 is urged axially against the pre-formed spherical portion 174 of the socket; the unit is radially compressed by force in the jig as schematically illustrated in FIGS. 36 and 37. The jig comprises radially acting tools which turns down the outer end of the socket onto the ball member until the final form shown at 174 in FIG. 37 is obtained. A ball joint means is thereby obtained which is free of play, not hard and perfectly suitable for mass production.

Such a device with ball joint centering means has an advantage over devices having assembly notches or flat portions a continuity of bearing surfaces. In fact during the running of this type of joint at an angle, the radial force transmitted is directed perpendicular to the plane of the break of the two shafts. This force therefore turns relatively to the two coupling parts of the device with ball joint centering means. Consequently the continuous spherical surfaces have a better wear resistance and avoid knocking which might be due to a discontinuity in the surfaces of the pivoted connection.

The heat treatment of the socket may be either a full hardening followed by an annealing sufficient to allow the circumferential hammering out of about 3% necessary for assembly or a quenching after high-frequency heating of the interior surface which produces a very hard frictional surface without preventing the hammering out assembly.

It is especially to be noted that:

1. The spherical star-shaped member has its arms angularly retained between the lobes of the tube thereby having room for their angular displacement without increasing the diametral dimension of the joint, nevertheless providing a simple, inexpensive and reliable holding.

2. The bearing (tongue) of the spherical star-shaped member is inserted in the sleeve;

3. The mounting and retaining of the spherical star-shaped member are made possible by chicking into place with 60° angular displacement relative to the shaft;

4. The ball-and socket joint is assembled by the radial hammering-out of the socket relative to the harder ball member; this provides an increased radial load capacity and a perfect continuity of contact during rotation of the radial force relative to the socket. This arrangement is novel and impossible to effect and assemble on known double joints.

Finally, the invention enables maximum sliding for a reduced size by double sliding between the ball member and the cylindrical socket. This arrangement is only possible with double tripod joints in which each individual tripod joint is practically homocinetic whilst this double sliding arrangement with known double joints would create the problem of operating at different angle for each of the individual tripod joints and therefore render the double joint non-homocinetic.

The advantages of the present constant velocity joints are thus fully apparent and include inter alia:

1. very high load capacity in joints of small dimension;

2. perfect homocinetic characteristics;

3. homocentricity of the shafts coupled;

4. the possibility of both very free sliding and very large operating angles;

5. the possibility of very high rotational speeds;

6. simplicity in construction and ease of manufacture. It is be noted that this joint functions very satisfactorily without requiring very narrow manufacturing tolerances; it is easy to assemble and its production cost is therefore low.

What I claim is:

1. A double tripod homokinetic joint comprising two single tripod homokinetic joints, ball joint centering means providing radial holding of said single tripod joints, a member common to both single tripod joints having closed roller paths of substantially circular cross section for transmitting torque between the two single tripod joints, and at least one of said single tripod joints being otherwise free of said member.

2. A double tripod joint according to claim 1, wherein each single tripod joint comprises a shaft including three-armed member with a roller on each of the arms, the ball joint means comprising a ball member and a socket, and the common member being formed as a sleeve, and each three-armed member being free of said sleeve except for the connection of said rollers therewith.

3. A double tripod joint according to claim 2, wherein the closed roller paths form the effective portion of the joint, and each includes two opposed arcuate portions surrounding an associated roller, a linear connection being provided between the closed roller paths.

4. A double tripod joint according to claim 2, wherein the closed roller paths form the effective portion of the joint, and each includes two opposed arcuate portions surrounding an associated roller, a circular connection being provided between the closed roller paths.

5. A double tripod joint according to claim 2, wherein a connection between the closed roller paths is provided, the connection being centered along the roller paths.

6. A double tripod joint according to claim 2, wherein the closed roller paths of substantially circular cross section are in opposed relationship, the distances between the center of the ball member and the plane passing through the axes of the three arms on each one of said shafts are substantially equal, one of said shafts having a ball-like member releaseably retained thereon, a cap carried by said sleeve mounted for oscillation on the ball-like member, elastic bellows in association with the cap closing off at least one end of the sleeve.

7. A double tripod joint according to claim 2, further comprising sloping members with sliding surfaces, said sliding surfaces substantially being the closed surfaces determined by the movement of the rollers when the joint is running at an angle.

8. A double tripod joint according to claim 2, wherein the joint is a homocinetic joint, one of the shafts having an axial bore, the ball member being carried by a bar, the bar being keyed in said one shaft against relative angular displacement, and a ring of anti-friction material in engagement with the outer surface of the socket on the other shaft.

9. A double tripod joint according to claim 2, wherein the interior surface of the socket is cylindrical, an anti-friction ring being interposed between the cylindrical interior surface of the socket mounted on one of said shafts and the ball member mounted on the other shaft; and wherein two three-armed washers with spherical bearing portions are arranged on the sleeve, a ball-like member being formed on said other shaft, said washers retaining the ball-like member in position.

10. A double tripod homokinetic joint comprising two single tripod homokinetic joints having each a shaft and each carrying three rollers, ball joint centering means for providing radial holding, means for transmitting the torque between the two single tripod joints comprising a sleeve member common to each single tripod joint and having closed roller paths of substantially circular cross section, a bowl-like member in contact with rollers on one of the said shafts and bearing against a collar fixed to the sleeve, a bellows providing sealing between the bowl-like member and said one shaft thereby reducing the axial and radial dimensions of the other side of the joint.

11. A double tripod joint according to claim 10, further comprising an elastomeric sheath enclosing the joint between the shafts, said sheath being elastically stretched longitudinally when the joint is at an angle.

12. A double tripod joint according to claim 10, wherein the ball member has a cavity coaxial with the shaft on which the ball member is mounted, a stud being urged against the interior surface of the socket by resilient means bearing against the closed end of said cavity.

13. A double tripod joint according to claim 10, wherein a blind cylindrical bore is provided in the end of the shaft carrying the socket, the bore includes a frusto-conical section at its closed end, and wherein the socket is longitudinally slidably mounted between the beginning of the frusto-conical section of the bore and a keeper ring.

14. A double tripod joint according to claim 10, wherein said bowl-like member is a star-shaped abutment member mounted on said one of the shafts between one of the rollers and circlips fixed to said one shaft, said star-shaped member having a spherical interior portion and a central aperture slightly larger than the diameter of said one shaft.

15. The double tripod joint of claim 10 wherein said sleeve member has a plurality of bearing members each having a part spherical exterior surface mating with and engaging a like part spherical interior surface of said bowl-like member.

16. The double tripod joint of claim 15 wherein said bearing members are disposed exteriorly of said sleeve members.

17. The double tripod joint of claim 15 wherein said sleeve member is of a trilobal cross section and each bearing member is disposed between adjacent lobes of said sleeve member.

18. The double tripod joint of claim 15 wherein said sleeve member is of a trilobal cross section and each bearing member is disposed between adjacent lobes of said sleeve member, and an elongated tubular cap carried by said sleeve member and enclosing said bearing members.

19. The double tripod joint of claim 18 wherein said collar is part of said cap.

20. The double tripod joint of claim 18 wherein said bellows extends between said cap and said one shaft.

21. A double tripod homokinetic joint comprising two single tripod homokinetic joints, ball joint centering means providing radial holding of said single tripod joints, a member common to both single tripod joints having closed roller paths of substantially circular cross section for transmitting torque between the two single tripod joints, said member common to both single tripod joints being an elongated sleeve member, each single tripod joint including a shaft having rollers thereon engaged in said roller paths, a bowl-like member of a star shape carried by one of said shafts, said bowl-like member having first fingers opposing said rollers and second fingers disposed externally of said sleeve member, and bearing members carried by said sleeve member guidingly engaging said second fingers.

22. The double tripod joint of claim 21 wherein there is a tubular cap surrounding said sleeve member and said bowl-like member, and said cap having means externally engaging said bowl-like member and axially and radially restraining said bowl-like member relative to said sleeve member.

* * * * *